(12) United States Patent
Meister et al.

(10) Patent No.: US 10,867,326 B2
(45) Date of Patent: Dec. 15, 2020

(54) REPUTATION SYSTEM AND METHOD

(71) Applicant: GIESECKE & DEVRIENT GMBH, Munich (DE)

(72) Inventors: Gisela Meister, Munich (DE); Dirk Wacker, Munich (DE); Katharina Wallhausser, Finsing (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 232 days.

(21) Appl. No.: 14/652,737

(22) PCT Filed: Dec. 9, 2013

(86) PCT No.: PCT/EP2013/003719
§ 371 (c)(1),
(2) Date: Jun. 16, 2015

(87) PCT Pub. No.: WO2014/095001
PCT Pub. Date: Jun. 26, 2014

(65) Prior Publication Data
US 2015/0332361 A1    Nov. 19, 2015

(30) Foreign Application Priority Data

Dec. 17, 2012  (DE) ........................ 10 2012 024 831

(51) Int. Cl.
*G06Q 20/38*  (2012.01)
*G06Q 30/06*  (2012.01)
(Continued)

(52) U.S. Cl.
CPC ......... *G06Q 30/0609* (2013.01); *G06Q 10/02* (2013.01); *G06Q 20/385* (2013.01); *G06Q 20/4014* (2013.01); *H04L 67/10* (2013.01)

(58) Field of Classification Search
CPC .................................................. G06Q 20/401
(Continued)

(56) References Cited

U.S. PATENT DOCUMENTS

| 6,741,852 | B1 * | 5/2004 | Mohrs | ................... | H04L 9/3271 |
| | | | | | 455/410 |
| 2002/0069174 | A1 * | 6/2002 | Fox | .................... | G06Q 20/3821 |
| | | | | | 705/52 |

(Continued)

FOREIGN PATENT DOCUMENTS

| EP | 1748398 A2 | 1/2007 |
| WO | 2012163970 A1 | 12/2012 |

OTHER PUBLICATIONS

International Search Report for corresponding International PCT Application No. PCT/EP2013/003719, dated Feb. 5, 2014.

*Primary Examiner* — Chinedu C Agwumezie
(74) *Attorney, Agent, or Firm* — Workman Nydegger

(57) ABSTRACT

A method for securing a transaction in a reputation system includes the following steps: authenticating a user vis-à-vis an end device by means of an electronic proof of identity for releasing authentication data for the digital identity that are stored on the end device, and authenticating the digital pseudonym assigned to the user vis-à-vis the reputation system by means of the end device while employing the stored authentication data pertaining to the digital pseudonym. The electronic proof of identity can be present as an electronic identity card in the form of a portable data carrier.

8 Claims, 5 Drawing Sheets

(51) Int. Cl.
*H04L 29/08* (2006.01)
*G06Q 20/40* (2012.01)
*G06Q 10/02* (2012.01)

(58) Field of Classification Search
USPC .......................................... 713/202; 705/67
See application file for complete search history.

(56) References Cited

U.S. PATENT DOCUMENTS

| | | |
|---|---|---|
| 2003/0182421 A1* | 9/2003 | Faybishenko ........... H04L 63/08 709/224 |
| 2004/0003247 A1 | 1/2004 | Fraser et al. |
| 2005/0091543 A1* | 4/2005 | Holtzman ............... G06F 21/31 726/19 |
| 2007/0124589 A1* | 5/2007 | Sutton ................... H04L 9/3273 713/169 |
| 2007/0143860 A1* | 6/2007 | Hardt .................. G06F 21/6254 726/28 |
| 2007/0203852 A1 | 8/2007 | Cameron et al. |
| 2009/0077643 A1* | 3/2009 | Schmidt ................ H04W 8/265 726/6 |
| 2009/0204542 A1 | 8/2009 | Doman et al. |
| 2011/0067086 A1 | 3/2011 | Nachenberg et al. |
| 2011/0276604 A1 | 11/2011 | Hom et al. |
| 2012/0066497 A1 | 3/2012 | Kumar et al. |
| 2012/0084565 A1* | 4/2012 | Wittenberg ........... H04L 9/3234 713/172 |
| 2012/0124192 A1* | 5/2012 | Daoud ............. G06F 16/24575 709/224 |

\* cited by examiner

REPUTATION SYSTEM AND METHOD

BACKGROUND

The present invention pertains to a method for securing a transaction in a reputation system, and to an end device for carrying out the method, and to a reputation system.

Reputation systems have become widespread in view of increasing digital communication and in view of increasing trade carried out via digital communication channels without personal contact. The goal is always to enable one communication partner or trading partner to appraise the credibility of the stated identity and the trustworthiness of another communication partner or trading partner without having to draw on personal experience.

Each participant of the reputation system is assigned a so-called reputation value for this purpose. Said value can change depending on how the participant behaves vis-à-vis the other participants in the course of time. A participant's reputation value consequently results from his previous relations with other participants of the reputation system and reflects qualitative and/or quantitative aspects of his previous interaction in the system. Reputation values hence allow a comparison of different participants of such a system.

An Internet merchant, for example, who always delivers flawless goods on time will thereby acquire a high/positive reputation value, substantially on the basis of incoming positive ratings from his customers. However, a customer who stands out because of poor paying habits and constant groundless complaints will in the course of time be assigned a rather low/negative reputation value since the customer's trading partners tend to rate him negatively.

Reputation systems can in principle be configured in diverse ways. A first class of such systems is characterized by a central entity which substantially facilitates and manages all communication between the participants of the system. A participant always logs into the system here vis-à-vis the central entity before a transaction within the reputation system is possible. An example of such a reputation system with a central entity is a social network, with the operator of the network performing the role of the central entity.

In addition, reputation systems are known that do not comprise a comparable central entity. Here, a participant connects directly to another participant of the system for carrying out an arbitrary transaction. An example of such systems is a so-called peer-to-peer network.

The term "transaction" is to be understood broadly within the context of the present invention, including any kind of analog and digital data communication within a reputation system that pertains to an exchange of information. The term is in particular not restricted to strict business transactions in which performance and counter-performance are exchanged against a monetary value, but is also to include for example those communications in which information, advice or opinions are supplied by some and picked up by others.

Reputation systems are described in general for example in US 2007/0203852 A1, US 2011/0276604 A1 or US 2009/0204542 A1.

The credibility of such reputation systems can suffer from reputation values of individual participants being forged or tampered with. Further, there is the problem that a participant's identity stated as a digital identity is practically unverifiable for other participants of the system. A stated digital identity can readily be a pseudonym, however. It cannot be excluded that for a real person a plurality of digital identities are acting in a system. In such cases it must be avoided, however, that a real person can also pretend to be a plurality of persons via different digital identities. Otherwise it would be possible for a participant of a reputation system to "bypass" a negative reputation value assigned to him by creating a new profile under a new digital identity and thus taking part in the system again "untainted". This would enable the participant, at least at first, to acquire an acceptably positive starting reputation value assigned to the new identity.

The employment of pseudonyms in payment systems is already known. The document WO 2012/163970 discloses a method for carrying out an anonymous payment transaction. A user can employ a pseudonym for payment. The user authenticates himself vis-à-vis a chip card. The chip card transmits user data to a card reader. The card reader sends the user data with the pseudonym to a bank server in encrypted form. The bank server supplies a unique identity of the user to the bank from the user's encrypted data.

Further, there is known from US 2004/0003247 a peer-to-peer network wherein network participants mutually authenticate themselves.

SUMMARY

The object of the present invention is to take account of the above-mentioned disadvantages and propose a method for participating in a reputation system that avoids the stated disadvantages.

This object is achieved by a method, an end device and a reputation system having the features of the independent claims. Advantageous embodiments and developments are stated in the dependent claims.

The invention is based on the fundamental idea of coupling the real identity of a user with a digital identity employed by the user in a reputation system by it being necessary for the user to authenticate himself vis-à-vis an end device while employing an electronic proof of identity before logging into the reputation system by means of the end device. The reputation system comprises the user's end device. The end device comprises a security module. Further, the reputation system comprises a further security module and/or a server.

More precisely, a method according to the invention for securing a transaction in a reputation system comprises a step for supplying an electronic proof of identity on the security module.

According to the invention, the user of the end device authenticates himself by means of an electronic proof of identity on the security module for releasing authentication data of the digital identity. Said release is effected after successful authentication of the user. This authentication step is preferably effected vis-à-vis the end device. An authentication vis-à-vis the security module would also be conceivable, for example by means of a PIN. The released authentication data of the digital identity can relate to, in particular contain, the user's real identity but also his digital identity. However, the authentication data can also relate to one or more digital pseudonyms. Thus, for example, pseudonyms possible only for the user are available after successful authentication by the user. The user could choose a pseudonym from the set of possible pseudonyms himself. It would also be conceivable for the end device and/or security module to select a pseudonym.

Further, a digital pseudonym assigned to the user of the end device is authenticated vis-à-vis the reputation system by means of the end device while employing authentication data pertaining to the digital pseudonym. The authentication data are preferably stored on the end device and/or on the security module.

The reputation system supplies a reputation value starting out from the authentication data. The reputation value pertains to the digital identity. This means that when a pseudonym is employed, authentication data corresponding to the pseudonym are employed, but the reputation system ascertains a reputation value pertaining to the digital identity. Further, the transaction to be secured is executed. After the transaction the reputation value of the digital identity pertaining to the transaction is updated by the reputation system. Thus, current reputation values are always available to the user and to the reputation system as well as to other users.

In principle, a security module can be a portable data carrier, such as for example a chip card, a secure mass memory card or a USB token. Portable data carriers can be insertable into the end device reversibly, for contact-type communication with the end device. The security module can also be a security module firmly incorporated into an end device, such as for example a Trusted Platform Module (TPM), a near field communication (NFC) module, an M2M module, a user identification module or a decoder module. The security module is a hardware security module. These options apply in principle to all specified security modules independently of each other. The security module can thus preferably be an electronic identity card or passport in the form of a portable data carrier.

The security module comprises the electronic proof of identity. The electronic proof of identity enables a unique assignment of the digital identity to the real identity. The electronic proof of identity can be a personal electronic identity card, in particular an electronic identity card in the form of a portable data carrier or passport.

An end device as intended by the present invention may be in particular a portable end device, such as for example a mobile radio end device, a smartphone, a tablet, a notebook or the like. The data communication of the end device with the reputation system is effected via a suitable communication network, for example via the Internet or the telecommunication network.

The security module can be supplied in the end device, as mentioned hereinabove. For this purpose, the security module can be furnished with data pertaining to the user's digital identity and/or with the authentication data through information of a provider, in particular a TSM, an issuer of the security module, the reputation system itself and/or an identity card office. Further, it can be provided that a personal identity card supplies certain personal data of the user, for example the digital identity, authentication data and/or pseudonyms, to the security module of the end device. In particular, an application on the security module of the user's end device could obtain necessary data for personalization vis-à-vis the network of the reputation system from the personal identity card. For this purpose, information about the presence of the data on the security module and/or the transfer of the data to the security module of the user's end device can be transmitted to the provider, in particular a central unit. From this information the personal identity card, in the present case, can be blocked for supplying the data to other security modules.

Further, it can be provided that a provider or issuer of the personal identity card permits only certain, in particular certified, pseudonyms or electronic identities for a reputation system. To enable a release of the authentication data of digital pseudonyms, an entitlement could thus additionally be demanded from the provider or issuer.

Preferably, the end device authorizes the user by checking the electronic proof of identity. After successful authorization by the end device, authentication data are released for carrying out the authentication of the digital pseudonym vis-à-vis the reputation system.

Within the context of the present invention, the terms authentication and authorization are employed in keeping with the language usage customary in the field. That is to say, within the context of an authentication operation one party identifies or "authenticates" himself to the other party, for example employing an electronic proof of identity or employing other authentication data, for example a user name and a password. The other party then "authorizes" the first party by checking the presented authentication data. As mentioned, the total process, i.e. the authentication and subsequent authorization, are described again altogether by the term "authorization".

According to the invention, the end device and/or the security module comprises a reputation securing device. Said device is arranged to carry out an authentication of a digital identity assigned to a user of the end device vis-à-vis a reputation system while employing authentication data pertaining to the digital identity that are stored on the end device. Further, the reputation securing device is arranged to carry out an authorization of the user on the basis of an electronic proof of identity of the user that is coupled with the end device.

The reputation securing device is preferably arranged to release the authentication data pertaining to a digital pseudonym that are stored on the end device, in particular security module, only after successful authorization of the user on the basis of the electronic proof of identity.

The reputation securing device according to the invention is preferably configured as a trustworthy application, normally within a secure environment of the end device. For example, the reputation securing device can be configured as a so-called "trustlet" within a so-called "Trusted Execution Environment". A "Trusted Execution Environment" is composed of a special security hardware environment and a security operating system acting in said environment, such as for example the applicant's security operating system MobiCore®, which can be employed in connection with a security hardware architecture according to the ARMO TrustZone® technology. The problems and deficiencies known from the prior art can be solved by means of the present invention. The combination with the electronic proof of identity enables a higher bindingness on the part of a participant of the reputation system to be obtained. This strengthens the trustworthiness of the participant's identity as well as his credibility. The invention's employment of the electronic proof of identity allows a unique, trustworthy authorization of the participant in question without any need to disclose his true identity in the reputation system. In particular, the participant can act under a pseudonym without this impairing his credibility. Attempts at tampering, such as for example the deletion of an old pseudonym or an old digital identity and the subsequent creation of a new digital identity for the same real user, will be reliably recognized by the reputation securing device in connection with the electronic proof of identity, and prevented. Although the participant and/or user starts a transaction in the reputation system anonymously under a pseudonym, the reputation value unique to the participant and/or user can be ascertained and exchanged. The invention is not only restricted to financial transactions. Instead, the use of the invention is also to be seen on other networks, for example social networks. By supplying a "correct" and unique reputation value pertaining to the user it is possible to ensure his trustworthiness in the network. This pertains not only to the user himself, but to all further participants found in the network, in particular the user's transaction partners. On the basis of the reputation value one might decide whether to accept a message from the user or transaction partner. Further, the security of the network might be increased by excluding participants with a certain reputation value and worse.

Preferably, the reputation system is part of the network. A network is understood here to be the successful log-in to a system, e.g. a social network. The reputation system can also be independent of the network. For the sake of simplicity, however, no distinction is made here.

The step of authenticating the digital pseudonym vis-à-vis the reputation system is preferably effected vis-à-vis a central entity of the reputation system, in particular a server or a multiplicity of central servers, if the reputation system comprises such a central entity. In the case of a social network for example, the operator of the network will accept and authorize the authentication data. If the authorization is successful, the participant, represented by a pseudonym linked with the digital identity, can make contact with other participants in the reputation system and carry out arbitrary transactions.

If the reputation system comprises no central entity, such as for example in connection with a peer-to-peer network, the step of authenticating the digital pseudonym is effected vis-à-vis an arbitrary other participant of the reputation system. Said other participant can be a server, computer or further security module. The other participant is a part of the reputation system. After successful authorization by said participant, and, where applicable, an authentication and authorization in the opposite direction, the transaction can then be effected between said two participants in the reputation system.

Hereinafter, for better readability, it will not always be distinguished in language whether or not the reputation system possesses a central entity. An action of a participant vis-à-vis "the reputation system" will instead mean the central entity of the system if such is provided, otherwise an arbitrary other participant of the reputation system whom the acting participant has addressed.

According to a preferred embodiment of the invention, tampering with digital identities can be reliably prevented by interaction of the invention's reputation securing device with the electronic proof of identity. The leading idea here is give a reputation securing device on an end device, the security module and/or the reputation system itself the possibility to dependably check whether more than one digital identity has been created for a real person in the end device, security module or the reputation system.

According to the invention, it is ensured that only exactly one underlying digital identity exists for a user. This can be obtained by deriving a user-individual key from an electronic proof of identity, which a user presents within the context of the authentication vis-à-vis the end device, through the reputation securing device, that is, in a secure and trustworthy manner.

The key is preferably derived such that the user's true identity cannot be inferred from the key, even when for example personal data of the user, such as for example a name, date of birth, address or the like are employed for deriving the key. The key can be formed for example by means of a hash value via a pre-specified data set of the electronic proof of identity. This enables a user to still remain anonymous—and nevertheless be uniquely identifiable.

It is essential that the user-individual key depends only on the data stored on the electronic proof of identity. In other words, the result is always the same no matter on which end device and at which time a key derivation is effected on the basis of one and the same electronic proof of identity.

Within the end device and in particular within the security module, tampering with digital identities can be prevented by means of the concept of a user-individual key by the reputation securing device, upon each authentication of a user vis-à-vis the end device and/or security module, deriving the user-individual key in the hereinabove described manner and checking whether a key corresponding to said key is already present on the end device and/or security module. If this is not the case, that means that the corresponding user is authenticating himself vis-à-vis the end device and/or security module for the first time. The reputation securing device then couples the derived, user-specific key with the digital identity assigned to the user. For example, the key can be stored in a secure manner together with the authentication data of the digital identity assigned to the user. Said coupling can also already be effected during a personalization of the reputation securing device.

If a key corresponding to the derived key is already present on the end device and/or security module, the reputation securing device checks for agreement of the digital identity in question. That is to say, it is checked whether the digital identity that is assigned to the user currently authenticating himself vis-à-vis the end device and/or security module agrees with the digital identity that is coupled with the already known, stored identical key. If the digital identities are likewise identical, this means that a user is authenticating himself vis-à-vis the end device and/or security module once again in the usual manner.

If the digital identities are different, this indicates an attempt at tampering, namely, the attempt to create different digital identities for a real user, represented by the user-individual key. The reputation securing device can reliably recognize such an attempt at tampering and prevent it for example by viewing the corresponding current authentication vis-à-vis the end device and/or the security module as having failed and aborting the process. Authentication data for logging into the reputation system are consequently not released.

A further known variant of tampering with digital identities, namely, the deletion of a digital identity and subsequent creation of a new digital identity—for the same real user—can also be easily prevented by the reputation securing device not deleting user-individual keys once they have been derived, even when a digital identity coupled therewith is deleted in the reputation system. Creation of the new identity then fails because the reputation securing device recognizes the old user upon first-time authentication by means of the electronic proof of identity for the newly generated digital identity on the basis of the derived user-specific key which is still stored in the end device and/or security module in an identical manner.

In a practically analogous manner, on the basis of the same concept of the user-individual key derived from the electronic proof of identity, one can prevent different digital identities from being created simultaneously and/or successively for one and the same user in the reputation system. That is to say, one can also prevent in a simple and secure manner those attempts at tampering by which a participant of a reputation system who has intent to tamper makes use of a plurality of end devices and/or security modules.

This merely requires that the end device, security module and/or reputation securing device transfers the derived, user-individual key together with the authentication data pertaining to the digital identity assigned to the user to the reputation system within the context of the authentication of the digital identity vis-à-vis the reputation system. The reputation system can then check an assignment of the digital identity to the user-individual key in the described manner within the context of the authorization of the digital identity.

For this purpose, the reputation system can for example create a database in which all user-specific keys ever received are stored, respectively coupled with that digital identity that has authenticated itself with the reputation system upon the first-time occurrence of the key. Upon each authentication of a digital identity vis-à-vis the system the latter then checks whether a key transferred with the authentication data assigned to the digital identity is already present in the database and, if so, whether said key already present is coupled with a digital identity corresponding to the digital identity currently authenticating itself.

If the reputation system comprises a central entity, for example a central server, the received user-specific keys are preferably managed there.

If a central entity is not provided, on the other hand, each further security module or each server or computer of a further participant of the reputation system must perform a corresponding data collection and check. Preferably, these tasks are likewise carried out by the reputation securing device. The reputation securing device is preferably present on each security module and/or computer of each participant of the reputation system. Each participant of such a system can then at least recognize tampering of this kind and prevent another participant from attempting to authenticate himself vis-à-vis this participant while employing different digital identities.

The carrying out of a transaction in the reputation system can require updating a reputation value pertaining to a participant's digital identity with reference to the reputation system. Such an updating is effected through the reputation system according to pre-specified methods, instructions and rules which are not the subject matter of the present invention.

When a central entity is used, an updating of the reputation value is preferably normally effected through the central entity of the reputation system. There, reputation values of the identities taking part in the system are normally also stored. Additionally, a reputation value can, in this scenario, also be stored on the participant's end device and/or on a security module containing the electronic proof of identity, preferably on a personal identity card.

In a reputation system without a central entity, the step of updating the reputation value of the user's digital identity is preferably effected through the end device. In particular, the reputation securing device can be arranged to update a reputation value pertaining to the digital identity according to pre-specified rules. Here, too, a reputation value can alternatively or additionally be stored on a security module containing the user's electronic proof of identity.

In detail, in a reputation system without a central entity, the user connects to the network and selects a pseudonym to protect his anonymity. In a further step, the authentication of the user vis-à-vis the security module is effected by means of the end device. In so doing, personal data, such as for example entitlement certificate, pseudonym and user authentication data, can be matched by the end device with the security module. The user is finally authorized by the security module and/or the end device.

Depending on the role of the user and the structure of the reputation system, the security module and/or the end device generates a cryptogram for authentication vis-à-vis the network. The transaction partner's security module obtains from the network a cryptogram comprising the user's reputation value. The transaction partner's security module supplies the transmitted reputation value for checking to the transaction partner.

The user starts the transaction. In so doing, data, such as for example transaction partner and transaction ID, are transferred to the security module. The security module prepares a cryptogram for the transaction data and transmits the cryptogram to the network. The transaction partner's security module obtains the cryptogram with the transaction data and, after a first check, delivers them to the transaction partner. Subsequently, the transaction partner prepares a rating of the transaction. The rating is transferred to the network as a cryptogram by the transaction partner's security module. The user's security module receives the cryptogram for the transaction rating and updates the reputation.

Even if many steps of this run of a reputation system of a user—transaction partner transaction have been performed by security modules, substeps can also be carried out by an end device, computer or server.

The reputation securing device can be arranged to authorize different users of the end device. It then releases the authentication data for that digital identity that is assigned to that real user of the end device who is identified and authenticated by the presented proof of identity.

Further, it is possible that a user is a participant in different reputation systems. In so doing, he can employ different pseudonyms which, however, are all linked with one digital identity. It is excluded that a user in a reputation system takes part in one and the same reputation system while employing a plurality of pseudonyms with different reputation values. A user's reputation value is always connected to a unique digital identity which is safeguarded by means of an electronic proof of identity. In a reputation system there is therefore always only exactly one reputation value present for a user. Accordingly, the reputation securing device can be arranged to carry out an authentication of one or more pseudonyms vis-à-vis different reputation systems.

If a user is a participant in a plurality of reputation systems while employing one or more pseudonyms, and said user can be assigned different reputation values in the different reputation systems, it can be provided to form a reputation profile of the user. For this purpose, the different reputation values pertaining to the pseudonyms are for example suitably taken into consideration. From a thus formed reputation profile there can then for example be derived a starting reputation value of the user for participation in a further reputation system. The determination of the reputation profile as well as of the starting reputation value can likewise be supported or carried out by the reputation securing device.

Preferably, the authentication data pertaining to the digital identity as well as, where applicable, one or more reputation values and/or a reputation profile are stored in the end device in a secure environment, preferably in a "Trusted Execution Environment". Only the reputation securing device then has access thereto, and only according to the hereinabove described method specifications.

For updating the reputation value there can be used a rating made by the user, a transaction partner and/or the reputation system. The user and/or the transaction partner can perform an input on his end device for this purpose. In particular, it is provided that the user rates the transaction partner and thus exerts influence on the transaction partner's reputation value. The transaction partner can in turn carry out a rating of the user and thus influence the user's reputation. A rating by the reputation system can be computed using different parameters, for example an evaluation of the transaction data, the transaction contents and/or the log-in times in a social network, the course of money transfer and/or a course of goods. The reputation value can then be determined with different weightings and, where applicable, the use of time intervals. In particular, an exact reputation value of the user and/or of a further participant can be supplied by rating all entities involved in the transaction. After the rating a final updating is normally carried out by the reputation system, so that the following transactions are always effected with current reputation values.

To supply the security module with personal data of the user, in particular a digital identity and/or a possible pseudonym, the security module can run through a personalization phase. Thus, after successful connection of the security module to the end device a secure channel can be established with a network, for example with a reputation system and/or a social network. Subsequently, an authentication is effected between the security module and the network. After successful authentication the network transfers an entitlement certificate to the security module. The security module then transmits a pseudonym (Restricted ID) to the network. Subsequently, the security module generates a key pair. The network generates a certificate as well as a starting reputation. The network can be supported or replaced in all steps by a third party, for example a TSM (Trusted Service Manager, a trustworthy switcher of data as a service provider having access to secure regions, for example TEE (Trusted Execution Environment), of a security module).

The end device is advantageously configured for carrying out an authentication of a digital pseudonym assigned to a user of the end device vis-à-vis a reputation system while employing authentication data pertaining to the digital pseudonym that are stored by the end device. The reputation securing device here is arranged to carry out an authorization of the user on the basis of an electronic proof of identity of the user that is coupled with the end device. Further, the reputation securing device is configured to release the authentication data pertaining to a digital pseudonym that are stored on the end device only after successful authorization of the user on the basis of the electronic proof of identity and to prepare a cryptogram which is suitable for supplying reputation values pertaining to the digital identity through the reputation system. The cryptogram can represent the transmission of a reputation value for a user of the end device. In particular, the cryptogram can comprise data which enable a deriving of the reputation value by the reputation system for example by means of a database. Preferably, the database is stored with the reputation securing apparatus or on a server. The cryptogram can comprise the reputation value directly. Expediently, the reputation system is embodied with a central entity. The central entity is embodied as a server and preferably likewise comprises a reputation securing apparatus. Furthermore, a cryptogram prepared by the reputation securing apparatus can comprise a rating performed by the user.

In principle, the method according to the invention, the end device as well as the reputation system can be used both for a user as the sender of a transaction and for the receiver of a transaction.

Further, it can be provided that the central entity carries out a match of the current reputation value with the digital identity of a user upon the authentication of the security module vis-à-vis the network (reputation system). The match can effectuate an advance updating of the reputation value on the security module or the central entity.

The reputation system according to the invention can thus not only be a system consisting of the security module and the end device of the user, with an entity supplying a reputation value pertaining to the user's digital identity. Rather, the system can comprise a central entity which consists of one or more servers which are supplied for example by a provider of the reputation system.

If there is no central entity available in the reputation system at least temporarily, the reputation system according to the invention can be restricted to the security module and the end device of the user and a computer and/or server of the transaction partner. Thus, there can be carried out an exchange of the reputation values before a transaction and, where applicable, likewise an updating of the reputation values after a transaction.

BRIEF DESCRIPTION OF THE DRAWINGS

The present invention will be described hereinafter by way of example with reference to the attached drawings. Therein are shown.

DETAILED DESCRIPTION OF VARIOUS EMBODIMENTS

Figure 1:
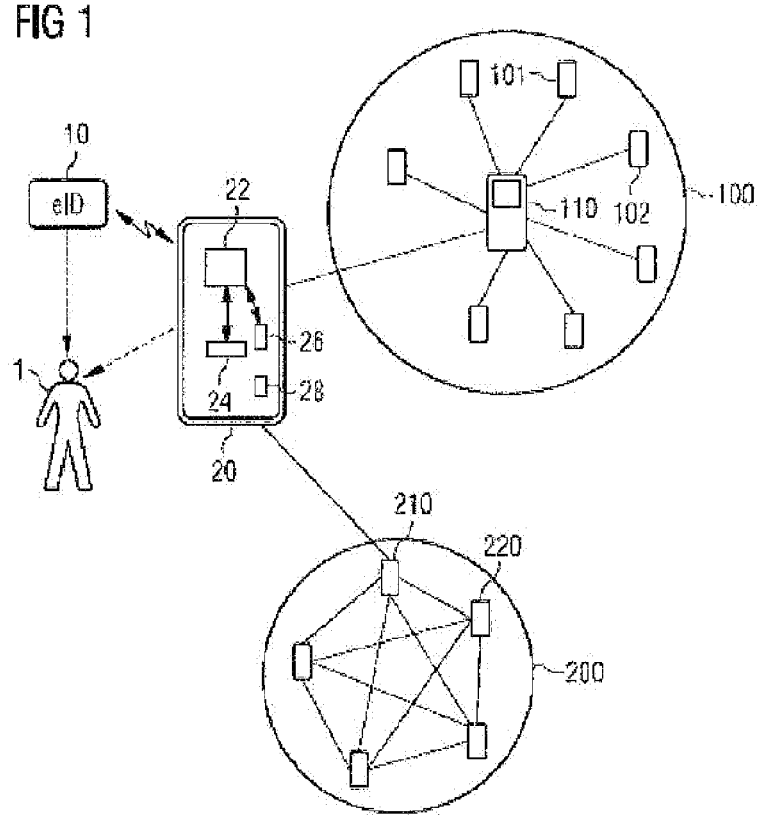
FIG. 1 components involved in the method according to the invention.

FIG. 1 shows a real user 1, who can be a participant in different reputation systems 100, 200. The user 1 is assigned an electronic proof of identity 10 as well as an end device 20. The electronic proof of identity 10 is stored in a portable data carrier in a secure manner.

The portable data carrier can typically be a card-shaped, personal electronic identification document in the form of a chip card, e.g. a national identity card, a passport booklet, a bank card, a driving license, a personal access card issued by an operator of a reputation system 100, 200, or the like. Other kinds and designs of portable data carriers are likewise possible, e.g. other card formats or token-like ones.

The end device 20 is represented as a smartphone in the present example. Other, similar end devices are alternatively employable, for example a mobile radio end device, a tablet, a notebook, or the like. In principle, it is also possible to employ stationary end devices, such as for example conventional personal computers.

The electronic proof of identity 10 is arranged to enter into data communication with the end device 20. This can happen in a contactless manner for example via a contactless near-field communication protocol such as NFC, or also in a contact-based manner via corresponding data communication protocols. The electronic proof of identity 10 is arranged to output an authentication cryptogram upon request by an end device 20. The authentication cryptogram can be any kind of data that are suitable for identifying the outputting entity, i.e. the electronic proof of identity 10, as unique and authentic. In a variant, the electronic proof of identity 10 can also be arranged to execute an application which manages a digital identity of a user, and/or a user profile, and returns a digital identity or user profile upon a request from an end device 20. The electronic proof of identity 10 can also be arranged to check external authentication data which are fed thereto from an end device 20.

In a further embodiment, the electronic proof of identity 10 can be configured to execute all security-relevant steps occurring within the context of a transaction, with the end device thus acting only as a transparent auxiliary unit or transferring unit between electronic proof of identity 10 and reputation system 100, 200.

The end device 20 comprises an application 22 that is trustworthy for a reputation system 100, 200—a so-called "trustlet"—which represents a reputation securing device 22 described in detail hereinafter with reference to FIGS. 2 and 3. The application 22 is preferably stored in a secure region, in a so-called "Trusted Execution Environment", and is executed there. Further, the end device 20 comprises external and internal authentication data 24, 26. Said data serve in particular to authenticate a digital identity assigned to the user 1 vis-à-vis a reputation system 100, 200, as explained hereinafter.

A user 1 has in principle exactly one digital identity assigned to him, which is provable by means of the electronic proof of identity 10. For a given unique digital identity, a user 1 can further employ a plurality of digital pseudonyms under which he acts in a reputation system 100, 200. The particular digital pseudonym, referred to hereinafter simply as the pseudonym, is stored in a user profile together with any further data relevant for a reputation system 100, 200. Such relevant data can be for example information about methods of payment or information provided voluntarily by a user.

The user profile can, in embodiments, wholly or partly also be stored on the electronic proof of identity 10 and be managed thereby. The pseudonyms are expediently managed by the reputation securing device 22. In embodiments, they can also be managed by the electronic proof of identity 10 or by the reputation system 100, 200.

The external authentication data 24 are known to the user and must be presented by him. The external authentication data 24 can be for example a user name or a password. They authorize a user 1 vis-à-vis the trustworthy application 22. They can moreover serve to authenticate a user in general vis-à-vis a reputation system 100, 200. The external authentication data 24 can for this purpose also comprise a plurality of information items which must be presented successively.

The internal authentication data 26 contain at least one information item which allows a reputation system 100, 200 to assign a user 1 a unique digital identity. The internal authentication data 26 can be for example the digital identity of the user 1 itself, an identifier, parts of the user profile or information derived from the stated data or prestored therefor. In an embodiment, the internal authentication data 26 contain an information item that is checkable for the reputation system 100, 200 and confirms that the digital identity for a pseudonym has been ascertained and checked by the end device 20 or by the electronic proof of identity 10. The internal authentication data 26 are known only to the trustworthy application 22 and the reputation system 100, 200, but not to the user 1.

Further, a user-individual key 28 can be stored in the end device 20. The nature and method of key generation as well as the employment of the key 28 will be described in detail hereinafter with reference to FIG. 4. Alternatively, a user-individual key 28 can also be stored on the electronic proof of identity 10.

The reputation system 100 is illustrated by a first basic embodiment of such a system, for example a social network. A central entity 110 of the reputation system 100, for example the operator of the social network, manages and stores all the data pertaining to the participants 20, 101, 102 of the system 100 and essential to the operation of the reputation system. In particular, the central entity 110 manages and stores data for authorizing the participants 20, 101, 102 as well as respective reputation values currently assigned to a participant 20, 101, 102. The authentication of a participant 20, 101, 102 vis-à-vis the system 100 is always effected vis-à-vis the central entity 110, as described with reference to FIG. 2. The central entity 110 further updates reputation values of individual participants 20, 101, 102 according to pre-specified rules. All transactions within the system 100 are processed via the central entity 110.

The reputation system 200 is represented by a second basic embodiment of a reputation system in which no central managing entity is provided, but merely equal participants 20, 210, 220 who can each come in contact with each other directly. The reputation system 200 is described here as a peer-to-peer network. The authentication of a participant 20 vis-à-vis another, selected participant 210 is effected through mutual authorization, as described in detail with reference to FIG. 3. Reputation values of individual participants 20, 210, 220, necessary information for mutual authorization as well as reputation values are stored by the individual participants 20, 210, 220 themselves. The updating of reputation values is also effected locally, with the individual participant 20, 210, 220.

The participants 20, 101, 102, 210, 220 can represent different roles. They can be for example members of a social network, buyers and sellers in digital trade, author and reader, with texts being supplied, reviewed and commented on, or players in a gaming portal. Diverse further scenarios are imaginable. Reputation values of individual participants respectively reflect their previous activity in the reputation system and are normally based primarily on a rating by other participants of the system.

Figure 2:
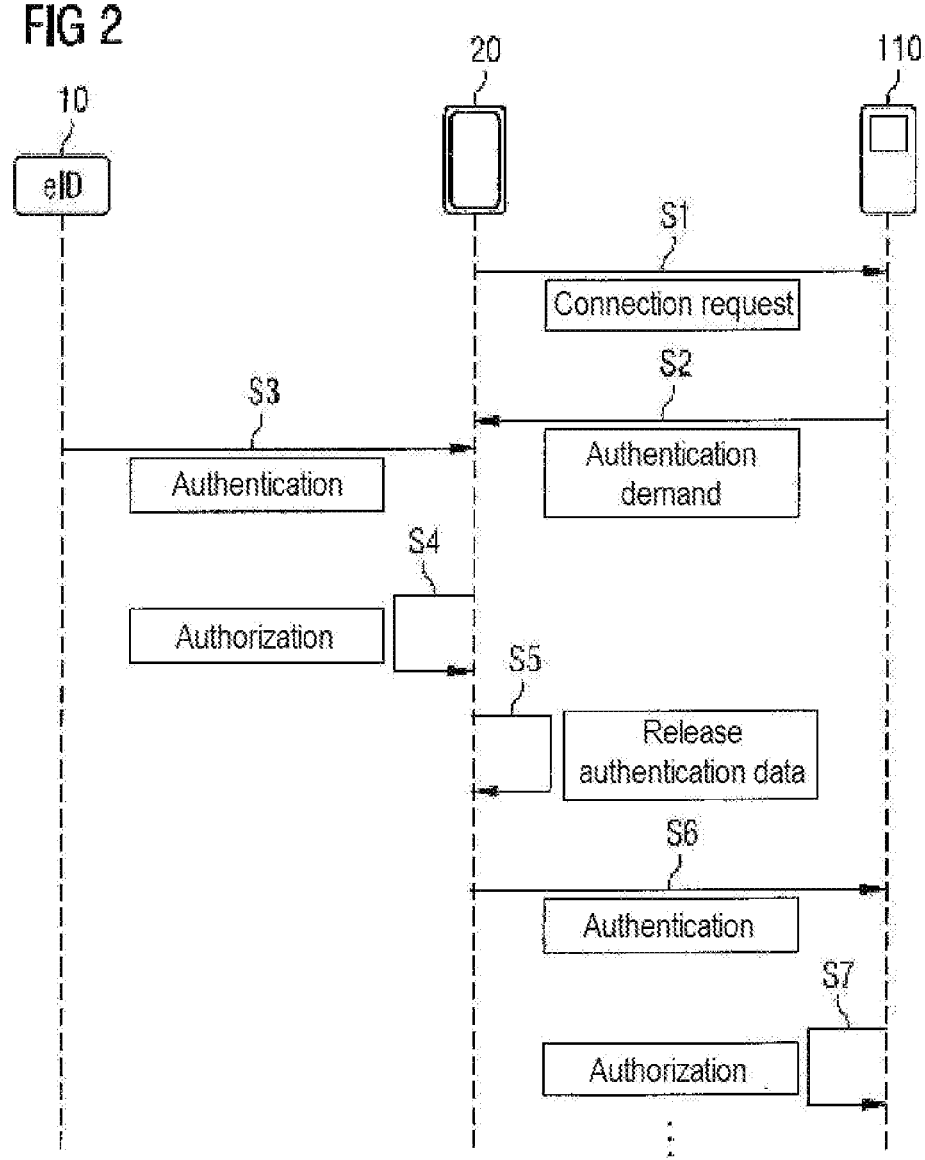
FIG. 2 steps of a first preferred embodiment of the method according to the invention.

With reference to FIG. 2, a first preferred embodiment of a method for securing a transaction in a reputation system 100 will be explained hereinafter. For the reputation system 100 a social network will be assumed by way of example (cf. FIG. 1).

In step S1, the end device 20 transmits a connection request to the central entity 110 of the reputation system 100 to log a digital identity assigned to a user 1 of the end device 20 into the system 100. The user 1 can have different digital pseudonyms available to him; if this is the case, the user 1 selects one of them in a preparation step; the digital pseudonym chosen can be identical with the digital identity of the user 1.

In response to the connection request the central entity 110 transmits an authentication demand to the end device 20 in step S2. It may be provided that the central entity 110 and the end device 20 or the reputation securing device 22 first carries out a unilateral or mutual authentication, for example by a challenge-response method.

In response to the authentication demand there are effected an authentication of the user 1 against the end device 20 or the reputation securing device 22, an authentication of the end device 20 vis-à-vis the electronic proof of identity 10 as well as an authentication of the digital pseudonym vis-à-vis the reputation system 100. All these steps are monitored and controlled in the end device 20 by the reputation securing device 22. The reputation securing device 22 carries out the authentication vis-à-vis the system 100 only when the user 1 has previously authorized himself successfully vis-à-vis the end device 20.

For authenticating the user 1 against the reputation securing device 22 and, where applicable, in general vis-à-vis the desired reputation system 100, 200, the user 1 presents external authentication data 24, for example a user name and a password, to the end device 20. The external authentication data 24 presented are compared by the reputation securing device 22 with ones stored in the end device 20.

In a variant, the end device 20 relays the external authentication data 24 presented by the user 1, for checking, wholly or partly to an electronic proof of identity 10 likewise to be presented by the user for this purpose.

After a successful check of the external authentication data 24 the authentication is effected with the central entity 110.

For this purpose, the user 1 authenticates himself by means of an electronic proof of identity 10, e.g. by means of an electronic identity card, vis-à-vis the reputation securing device 22, therefore vis-à-vis the end device 20.

Unless this has already happened, e.g. for the check of external authentication data 24, the user 1 accordingly presents an electronic proof of identity 10 to the end device 20. It is expediently provided that the end device 20 and the electronic proof of identity 10 first carry out a mutual authentication, for example by a challenge-response method, and set up a secure channel in which the subsequent data exchange is effected in encrypted form.

Subsequently, the reputation securing device 22 enters into a data exchange with the electronic proof of identity 10 in step S3. The data exchange can be effected automatically or require an activity of the user 1. For the electronic proof of identity 10 an electronic identity card will always be assumed hereinafter to facilitate description.

In the data exchange, the reputation securing device 22 transmits a demand to the identity card 10, in response to which the identity card 10 returns an authentication cryptogram. The demand can be e.g. an entitlement certificate, which directly or indirectly designates the reputation system 100, 200. It can further be already contained, in parts or also completely, in the authentication demand of the central entity 110.

In an embodiment variant, the demand forms a command in response to which an application is executed on the identity card 10. The application can consist in the identity card 10 immediately ascertaining and checking a digital identity. For an ascertained digital identity the identity card 10 can also ascertain a pseudonym. It returns the digital identity and/or pseudonym to the reputation securing device 22 as an authentication cryptogram. In a variant, the identity card 10 only returns an information item confirming that a digital identity and/or pseudonym has been checked positively in the identity card 10.

In a further variant, whole user profiles can be managed by the application on the identity card 10. In this case, the identity card 10, in response to a command for execution of the application, additionally returns the user profile or parts thereof to the reputation securing device 22.

In a further embodiment, the management of reputation values can also be effected on the identity card 10. In this case, the identity card 10, in response to a command for execution of the application, additionally returns a reputation value assigned to a digital identity or a pseudonym to the reputation securing device 22 in the authentication cryptogram.

In a further embodiment, the identity card 10, in response to a command for execution of the application, forms complete or substantially complete internal authentication data 26. The function of the reputation securing device 22 with respect to the handling of such internal authentication data 26 then consists substantially in converting them to a protocol suitable for communication with the reputation system 100, 200. The supplying of the internal authentication data 26 can moreover be furnished with a time limit after which they lose their validity.

In step S4, the reputation securing device 22 checks the authentication cryptogram. In a simple manner, the check can be effected through comparison for agreement with a reference value stored in the end device 20.

In the positive case, the reputation securing device 22 ascertains for the authentication cryptogram a digital identity and a user profile. With the two it ascertains authentication data 26, which it releases in step S5.

If the authentication cryptogram contains a digital pseudonym or a digital identity or confirmation information item, the reputation securing device 22 ascertains an appurtenant user profile after successful authentication of the identity card 10, thereafter forms authentication data 26, and releases them in step S5. If the reputation securing device 22 has obtained a user profile from the identity card 10, it completes it, where applicable, forms authentication data 26 therewith, and releases them in step S5. The internal authentication data 26 contain the digital identity and/or the pseudonym in this case.

In a variant, it can be provided that the check of the authenticity of the digital identity and/or assigned pseudonyms is effected by the reputation securing device 22. If the authentication cryptogram contains a digital identity or a pseudonym in this case, the reputation securing device 22 checks whether the digital identity or pseudonym is authentic and forms an confirmation information item. In an embodiment of this variant, it can further be provided that the reputation securing device 22 manages the reputation values for a digital identity or the assigned pseudonyms. The reputation securing device 22 assigns a reputation value to a positively checked identity or an assigned pseudonym in this case. The confirmation information item is inserted into the internal authentication data 26 by the reputation securing device 22. It likewise inserts a possibly assigned reputation value into the internal authentication data 26.

In step S6, the reputation securing device 22 transmits the released internal authentication data 26 to the central entity 110.

In addition to authentication, further functionalities of the electronic identity card 10 can furthermore be utilized. The results therefrom are likewise transmitted to the central entity 110 in step S6.

If the authorization of the user 1 fails, e.g. because he has presented a false proof of identity 10, the method is aborted. The internal authentication data 26 are then not released and an authentication of the digital identity vis-à-vis the system 100 is not possible.

The central entity 110 checks the received internal authentication data 26 in step S7, thereby authorizing the pseudonym as a participant of the reputation system 100. If the authorization is successful, the reputation system 100 ascertains the digital identity for the pseudonym and assigns it a reputation value.

If a digital identity created by the reputation securing device 22 or by the electronic proof of identity 10 or a pseudonym was already transmitted to the reputation system 100 in the internal authentication data 26, the reputation system 100 checks it and assigns it a reputation value.

If there was transmitted to the reputation system 100 in the internal authentication data 26 a confirmation information item that the check of the digital identity for a pseudonym was already carried out by the reputation securing device 22 or by the electronic proof of identity 10, the reputation system 100 checks the confirmation information item and thereafter assigns the pseudonym a reputation value. If the confirmation information is merely confirmed that the check of the digital identity was effected by the reputation securing device 22 or by the electronic proof of identity 10, the reputation system 100 checks whether the pseudonym employed by the user 1 is authentic. In the positive case, it assigns the pseudonym a reputation value.

If there was already assigned to the reputation system 100 in the internal authentication data 26 a reputation value assigned by the reputation securing device 22 or by the electronic proof of identity 10, the reputation system 100 adopts said value.

Subsequently, the user 1 is logged into the system 100 and can enter into contact with other participants of the reputation system 100, and carry out transactions, via the central entity 110 while employing the chosen pseudonym and his user profile and with the assigned reputation value. If the authentication fails, transactions with other participants are not possible.

Each transaction in the system 100 that involves the digital entity of the user 1 normally leads to a change of the reputation value assigned to the digital identity in the reputation system 100. To capture this, the reputation value is therefore updated regularly. The updating is carried out by the reputation system 100 itself, i.e. by the central entity 110. In the central entity 110 the current reputation values of the participants are thus expediently stored. Optionally, a participant's reputation value can additionally be stored with the participant himself, for example in the end device 20, and/or in the electronic proof of identity document 10.

As illustrated in FIG. 1, a user 1 can be a participant in different reputation systems 100, 200. In each reputation system 100, 200 a user 1 can employ a plurality of, and different, pseudonyms for his digital identity. In different reputation systems 100, 200 a digital identity can respectively be assigned different reputation values. However, different pseudonyms for a digital identity are always assigned only exactly one reputation value in a reputation system 100, 200.

The reputation securing device 22 can further form a reputation profile for the user 1 from different reputation values, and store and manage it tamper-resistantly in the secure region of the end device 20. From such a reputation profile a starting reputation value can then be computed for example when the user becomes a participant of a further reputation system (not shown).

Figure 3:
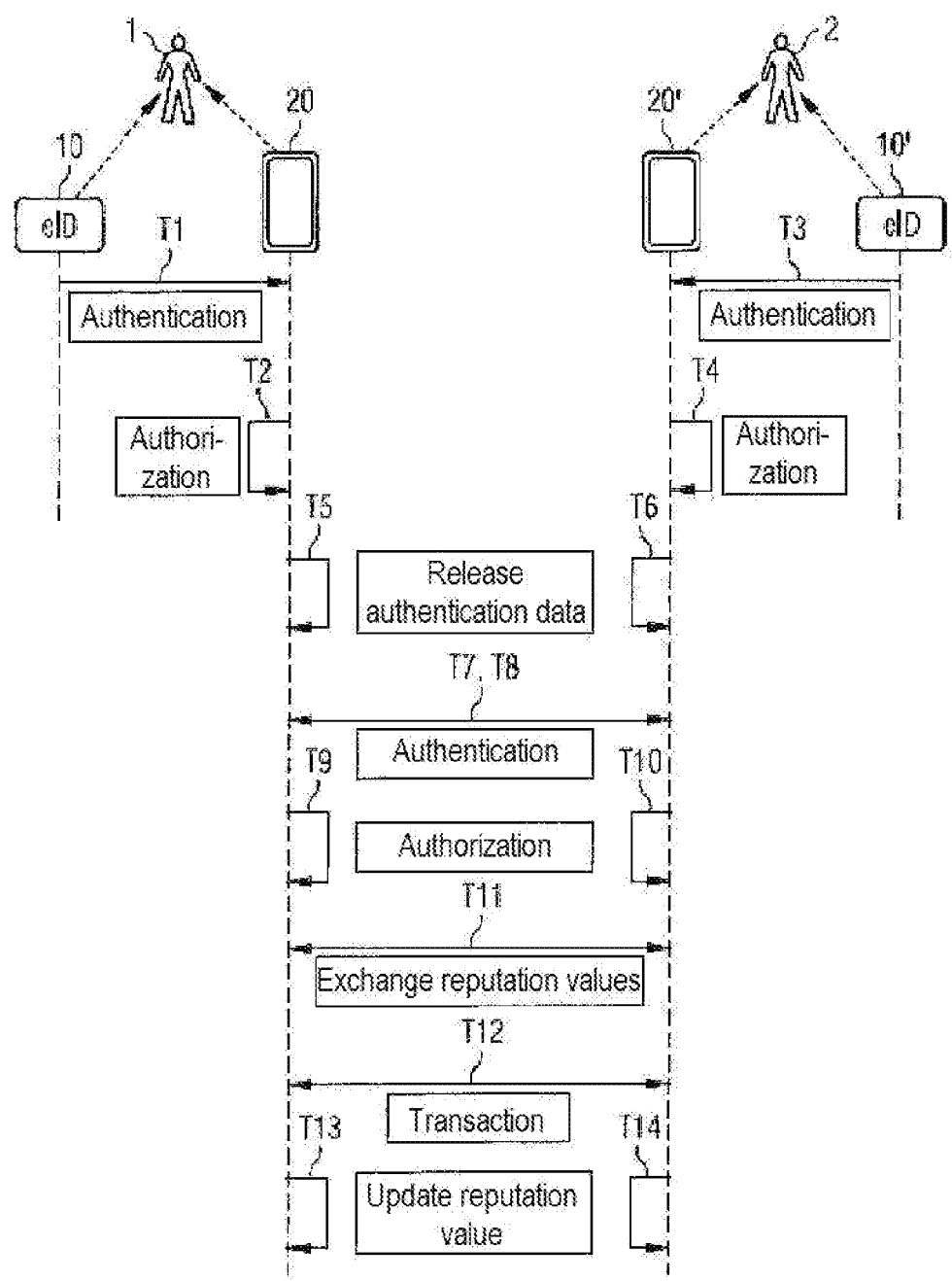
FIG. 3 steps of a second preferred embodiment of the method according to the invention FIG. 4 steps of a preferred variant of the method described with reference to FIG. 2.

With reference to FIG. 3, there will hereinafter be described a second preferred embodiment of a method for securing a transaction in a reputation system 200, which is represented here by way of example as a peer-to-peer network (cf. FIG. 1). When the method steps are the same as those described hereinabove in the method with reference to FIG. 2, the description will not be repeated. Only the essential differences of the two methods are to be pointed out.

In contrast to the first described reputation system 100 having a central entity, in the reputation system 200 a participant 20 contacts the system 200 directly via an arbitrary, freely selectable participant 20' of the system 200. The activity of the participant 20 within the system 200 is subsequently restricted to the connection to the chosen participant 20'. A transaction with a further participant requires a further authentication vis-à-vis said further participant as well.

Since the system 200 comprises only equal participants, all activities for preparing a transaction (cf. step T12) are normally to be respectively performed by both participants 20, 20' in the same manner.

Before a mutual authorization can be carried out, which is indicated with reference to the steps T7 to T10, an authentication of the respective users 1, 2 vis-à-vis their respective end devices 20, 20' must respectively take place. This is indicated in the steps T1, T2 and T3, T4. If the authorization in step T2, T4 was successful, the respective internal authentication data 26 can thereafter be released in the end devices 20, 20' by the reputation securing devices 22 respectively embodied there (cf. steps T5, T6) in order to enable an authentication vis-à-vis the respective other participant 20, 20' (cf. steps T7, T8).

The mutual authentication can be effected wholly or partly with involvement of the identity card 10, if the latter is arranged for this purpose. The end device 20 thus transmits to the identity card 10, for checking, the internal authentication data 26 obtained from the respective other end device 20, 20'.

Optionally, functionalities of the identity card 10, in particular cryptographic functionalities, can also be utilized within the context of the mutual authentication (cf. steps T7, T8) in this method.

Before the executing of a transaction in step T12 the respective reputation values can optionally be exchanged in step T11. This affords each participant 20, 20' a realistic and current appraisal of the other participant before the transaction is carried out.

After the transaction in step T12, it may be necessary for the respective reputation securing devices 22 to update the reputation values assigned to the respective digital identities, as indicated with the steps T13 and T14.

After the transaction in step T12, one participant can for example rate the behavior of the other participant during the transaction. This rating can then enter into the updated reputation value, within the context of the updating in step T13, 14.

Figure 4:
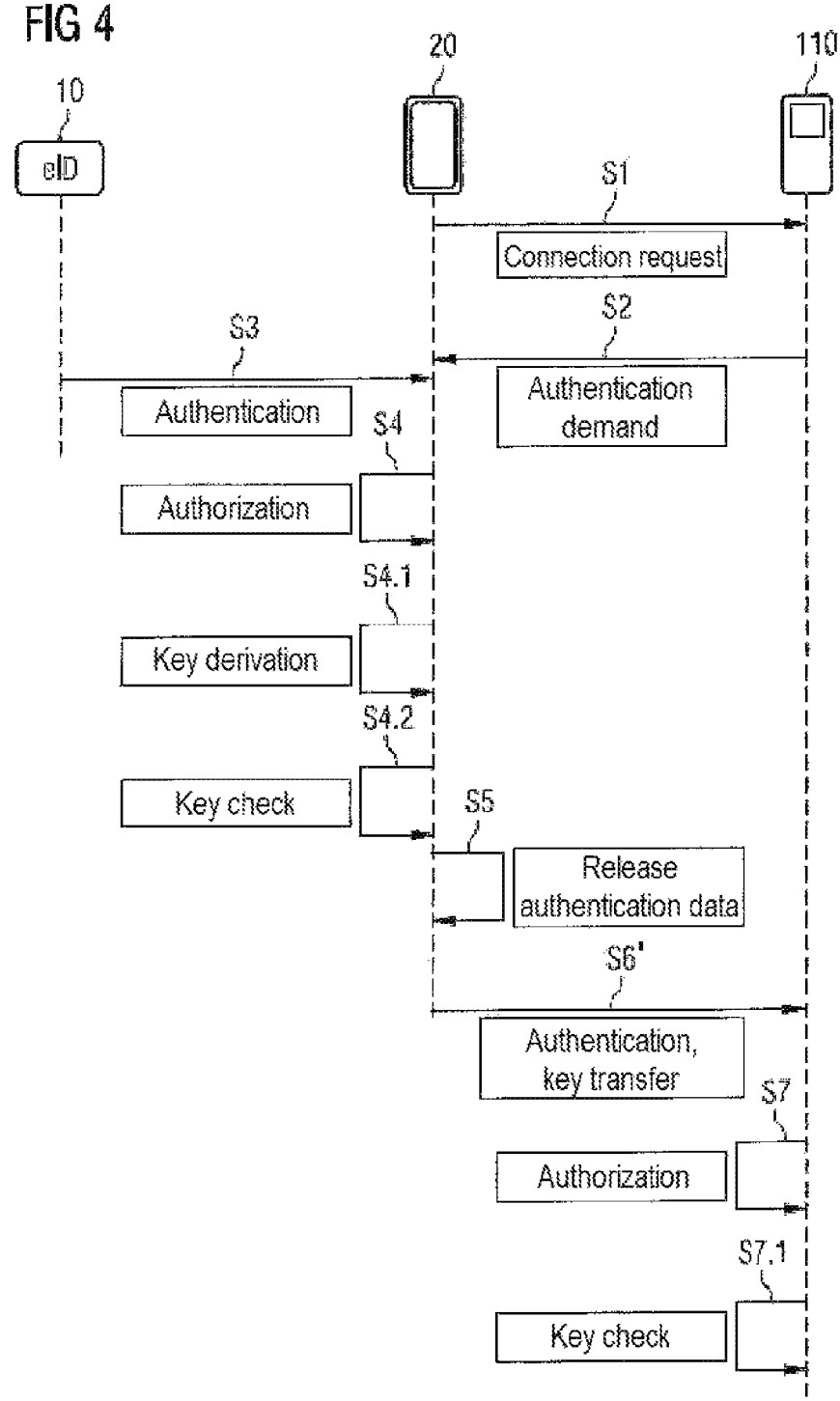

The method finally described with reference to FIG. 4 corresponds to a variant of the method that was described hereinabove with reference to FIG. 2. The steps S1 to S5 and S7 are identical and will hereinafter not be described again. Step S6 is slightly modified, while the steps S4.1, S4.2 and S7.1 are newly added.

In contrast to the method according to FIG. 2, the reputation securing device 22 in the step S4.1 derives a user-individual key 28 from the authentication cryptogram delivered by the electronic proof of identity 10, for example while employing a hash value or the like.

In the optional step S4.2, the reputation securing device 22 subsequently checks whether a key corresponding to the derived key 28, i.e. identical thereto, is already stored in the end device 20. If this is not the case, the reputation securing device 22 stores the key 28 together with the authentication data 24. This establishes a coupling of the electronic proof of identity 10 with the digital identity assigned to the user 1.

Such a coupling takes place only upon the first authentication of the user 1 vis-à-vis the end device 20.

If a key identical to the key 28 is already present in the end device 20, the reputation securing device 22 checks whether the user profile provided by the user 1 for employment is based on the digital identity coupled with the stored key. If this is the case, the method is continued with step S5 as described, otherwise aborted.

In the step S6' the key 28 is also transferred to the central entity 110 of the reputation system 100 in addition to the authentication data, deviating from step S6 according to FIG. 2.

The central entity 110 carries out, in addition to the authorization of the digital identity (step 7), in step S7.1 a check of an assignment of the key 28 to the digital identity authenticating itself. In essence, said check takes place analogously to the key check in step S4.2. Thus, step S4.2 could be omitted. On the other hand, attempts at tampering already recognized in step S4.2 relieve the resources of the reputation system 100, since then the method is already aborted in step S4.2, as described, and the steps S7 and S7.1 no longer need to be executed.

Unlike the end device 20, which can only store those keys that have been derived internally from electronic proofs of identity 10 employed for authentication vis-à-vis the end device 20, the central entity 110 stores all user-specific keys that have ever been received together with authentication data by the entity. Thus, attempts at tampering can be recognized in step S7.1 that are not yet recognizable in step S4.2.

The central entity 110 checks in step S7.1 whether a key identical to the received key 28 is already stored in a database of the central entity 110. This is equivalent to a digital identity having already authenticated itself with the reputation system 100 previously with additional presentation of a key identical to the key 28. The key 28 must not be confused here with the authentication data 24. The latter are checked in step S7.

If the key 28 is not yet present in the system 100, the central entity 110 stores the key 28 together with information on the digital identity currently authenticating itself.

If the key 28 is already present in the system 100, the central entity 110 checks whether the digital identity coupled with the already present key is identical to the digital identity currently authenticating itself. If this is the case, the authentication of the digital identity is successful, otherwise the method is aborted.

As is readily recognizable, the method that has been described with reference to FIG. 3 can also be adapted accordingly.

While maintaining the basic idea, namely, to carry out a user's authentication vis-à-vis a reputation system using an electronic proof of identity and to couple a valid reputation value with a unique digital identity authenticated by the electronic proof of identity, independently of an employed pseudonym, the invention permits a number of modifications which have not been individually described hereinabove. Primarily, some method steps can be performed in a changed order or at other times; this applies e.g. to the presentation of the electronic proof of identity on the end device or the setting up of a secure channel between electronic proof of identity and end device. Further, the apportionment of primarily security-relevant functionalities for securing a transaction between electronic proof of identity 10 and reputation securing device 22 can also be effected in different ways from those expressly described.

Figure 5:
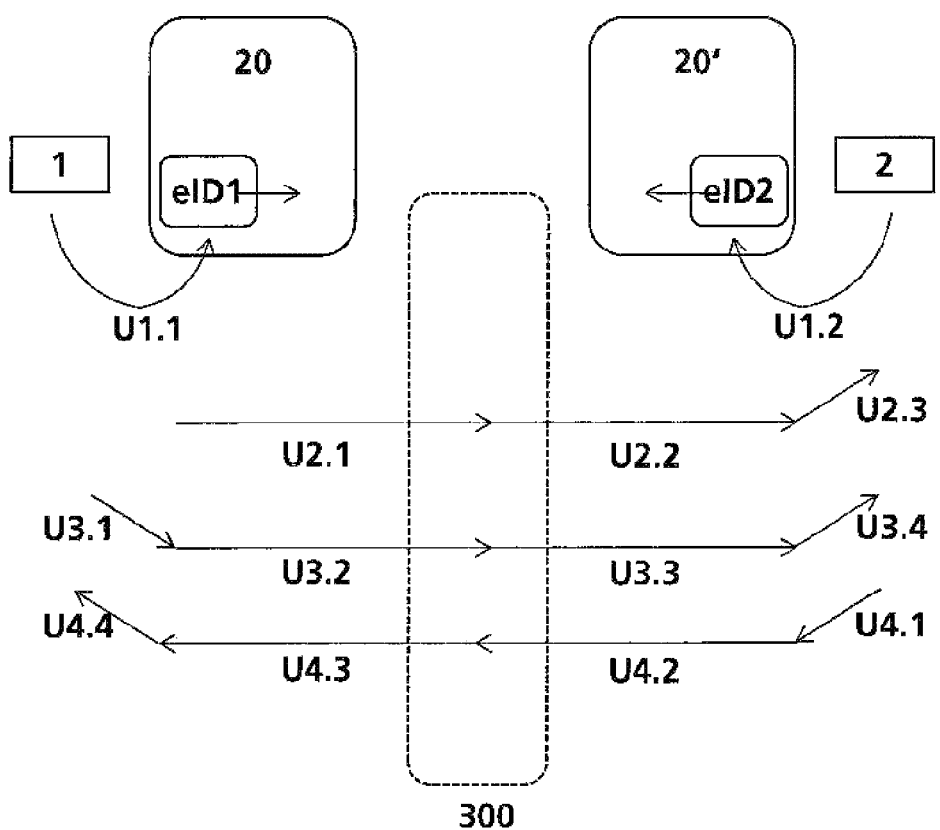
FIG. 5 steps of a further variant of a method according to the invention.

FIG. 5 represents a further course of the method according to the invention. For securing a transaction between a user 1 and a further user 2 in a social network 300, the social network 300 comprises a reputation system. An end device 20 of the user 1 comprises a security module eID1. A further end device 20' of the further user 2 comprises a further security module eID2. The two security modules eID1 and eID2 are expediently configured as elements embedded in the end devices 20, 20'.

The security module eID1 is already personalized for the user 1. For personalizing the security module eID1, the user 1 connects to the social network 300 with the end device 20 in this exemplary embodiment. For the connection a secure channel is established, for example by means of the TLS (Transport Layer Security) protocol. Via the end device 20 the security module eID1 authenticates itself vis-à-vis the network 300. Subsequently, the network 300 transfers an entitlement certificate to the security module eID1. The security module eID1 thereupon transfers to the social network 300 a pseudonym corresponding to the digital identity of the user 1. Further, the security module eID1 generates a for example PKI key pair for authentication in the network 300. The security module eID1 transmits a public key to the network 300. The network 300 generates for the obtained key a certificate and a root key for verifying certificates. Further, the network 300 generates a starting reputation. The starting reputation is an initial reputation value which each "new" user obtains from the social network 300. The value can be for example a neutral value, for example the number zero or "50%", depending on the form of the reputation scale. Alternatively, the starting reputation can be a statement "new user". The certificate, the root key and the starting reputation are transferred to the security module eID1 of the user 1.

For executing a secure transaction between the user 1 and a user 2 in the reputation system 300, the user 1 authenticates himself vis-à-vis the security module eID1 in the step U1.1. The user 1 can, in so doing, select the network 300 and a pseudonym. In the step U1.2, the user 2 authenticates himself, independently thereof, vis-à-vis the further security module eID2.

In the step 2.1, the security module eID1 generates a cryptogram which is based on the pseudonym of the user 1, his reputation value and the authentication vis-à-vis the network 300. The security module eID1 transfers said cryptogram via the network 300 to the transaction partner, i.e. the user 2. The further security module eID2 of the user 2 receives a cryptogram from the network 300 in the step U2.2. From said cryptogram the further security module eID2 recognizes the pseudonym of the user 1 and his reputation value. In the step U2.3 the further security module eID2 transfers the information recognized from the cryptogram to the user 2 for checking. This happens for example through display and input on the end device 20' of the user 2.

In the step U3.1, the user 1 initiates a transaction. The data of the transaction, the pseudonym and a transaction ID are sent from the security module eID1 to the network 300 in the form of a cryptogram in the step U3.2. The further security module eID2 of the user 2 receives the cryptogram from the network 300 in the step U3.3 and delivers the data to the end device 20' in the step U3.4 for checking and inspection by the user 2. The user 2 makes a rating of the transaction in the step U4.1 and delivers it to the further security module eID2. The further security module eID2 transfers the rating to the network 300 in a cryptogram in the step U4.2. In the step U4.3, the network 300 transfers a cryptogram with the rating to the security module eID1. The security module eID1 receives a cryptogram with the rating from the network 300 in the step U4.4. A reputation securing device (not represented) of the security module eID1 subsequently updates the reputation value of the first user 1 while employing the rating.

Further information can be added to the transaction and the cryptograms by the network 300. Furthermore, information from the cryptograms to be transferred can also be filtered out for one's own employment. For example, the reputation value can be supplied in the step U2.1 of the user 1 not by the security module eID1 but by the network 300. The network 300 obtains for this purpose the reputation value 1 pertaining to the user from a reputation system working in the background, in particular a server. Accordingly the rating of the user 2 is intercepted by the reputation system from the cryptogram in the step U4.2 and processed into a current reputation value of the user 1.

As to be recognized from the representation of FIG. 5, a so-called peer-to-peer connection exists between the user 1 and the user 2. The network can of course comprise a server which manages the connection and, if necessary, modifies the cryptograms between the security modules eID1 and eID2.

The invention claimed is:

1. A method for securing a transaction system using a reputation system, an end device having a security module, and a portable data carrier, the method comprising the steps of:
   receiving, by the security module, data from the portable data carrier that proofs a digital identity stored in the security module;
   storing, by the security module, authentication data and the digital identity, wherein the digital identity is associated with one or more digital pseudonyms;
   accessing, by the security module, at least one digital pseudonym using the authentication data;
   sending, by the security module, the digital identity or at least one digital pseudonym to the reputation system;
   mutually authenticating with the portable data carrier by the security module and based on the mutual authentication creating a channel between the portable data carrier and the end device;
   authenticating, by the security module, a user of the end device through the channel using the authentication data;
   based on the authenticating of the user, sending, by the security module, the authentication data to the reputation system;
   identifying, by the reputation system, a transaction associated with the user;
   based on the identified transaction, updating, by the reputation system, a reputation value; and
   sending, by the reputation system, the reputation value to the security module, wherein the reputation value is a rating of the user or of the reputation system, and
   wherein the reputation value is stored in the security module.

2. The method according to claim 1, wherein for authentication of the digital pseudonym with respect to the reputation system the following steps are carried out:
   establishing the digital identity assigned to the digital pseudonym and, checking the digital identity.

3. The method according to claim 2, wherein within the context of the authentication with respect to the reputation system the following further steps are carried out:
   establishing the reputation value assigned to the digital identity, and
   assigning the reputation value to the digital pseudonym.

4. The method according to claim 1, wherein the authentication data pertaining to the digital pseudonym are stored on the end device and/or on the portable data carrier, and checking the digital identity and assigning the reputation value are carried out by the reputation system.

5. The method according to claim 1, wherein authenticating with respect to the reputation system is effected by a central entity of the reputation system when the reputation system comprises such a central entity, and a further security module of an arbitrary participant of the reputation system when the reputation system comprises no central entity.

6. The method according to claim 1, wherein the end device and/or security module of the user derives a user-individual key from an electronic proof of identity stored in the portable data carrier within the context of authenticating the user, and within the context of authentication the following further steps are carried out:
   transferring the user-individual key to the reputation system together with the authentication data pertaining to the digital identity by the end device, and
   checking the assignment of the digital identity to the user-individual key by the reputation system.

7. The method according to claim 1, further comprising:
   forming a reputation profile of the user while taking into account different reputation values pertaining to digital identities of the user and respectively relating to different reputation systems.

8. The method according to claim 1, wherein the reputation value is supplied by the security module of the user, a further security module and/or the central entity.

* * * * *